United States Patent [19]

Kurihara et al.

[11] Patent Number: 4,613,791
[45] Date of Patent: Sep. 23, 1986

[54] AUTOMATIC LIGHT CONTROL APPARATUS FOR VEHICLE

[75] Inventors: Norimitsu Kurihara, Wako; Yoshikazu Tsuchiya; Akira Kikuchi, both of Fujimi; Tohru Tanabe, Yokohama; Kunio Okazaki, Hatano, all of Japan

[73] Assignees: Honda Motor Co., Ltd.; Stanley Electric Co., Ltd., both of Tokyo, Japan

[21] Appl. No.: 695,387

[22] Filed: Jan. 28, 1985

[30] Foreign Application Priority Data

Feb. 2, 1984 [JP] Japan .................................. 59-18052
Mar. 29, 1984 [JP] Japan .................................. 59-61729

[51] Int. Cl.⁴ ............................................ B60Q 1/02
[52] U.S. Cl. .................................. 315/82; 307/10 LS; 315/83
[58] Field of Search ................ 315/82, 83; 307/10 LS

[56] References Cited

U.S. PATENT DOCUMENTS

2,699,834  1/1955  O'Brien ................................. 315/83
3,828,220  8/1974  Moore et al. ......................... 315/82

Primary Examiner—Harold Dixon
Attorney, Agent, or Firm—Frishauf, Holtz, Goodman & Woodward

[57] ABSTRACT

An automatic light control apparatus for a vehicle comprises an external light detector for selectively turning on and turning off at least one of tail lamps, side marker lamps and head lamps of a vehicle in accordance with the detected external light. A further detector is provided for detecting the ON period of an illuminating light having a fluctuating light value (for example generated by an A.C. voltage source), and the lamps are further controlled in accordance with the detected ON period of the fluctuating light value in conjunction with the signals generated by the external light detector, for controlling the illumination of the lamps of the vehicle. A further detector may be provided for detecting an abrupt change in the illumination level, and for controlling the vehicle lamps further in accordance with the detected abrupt change.

11 Claims, 12 Drawing Figures

AUTOMATIC LIGHT CONTROL APPARATUS FOR VEHICLE

BACKGROUND OF THE INVENTION

The present invention relates to an automatic light control apparatus which automatically turns on or off a vehicle light in accordance with external light.

Prior Art

Figure 1:
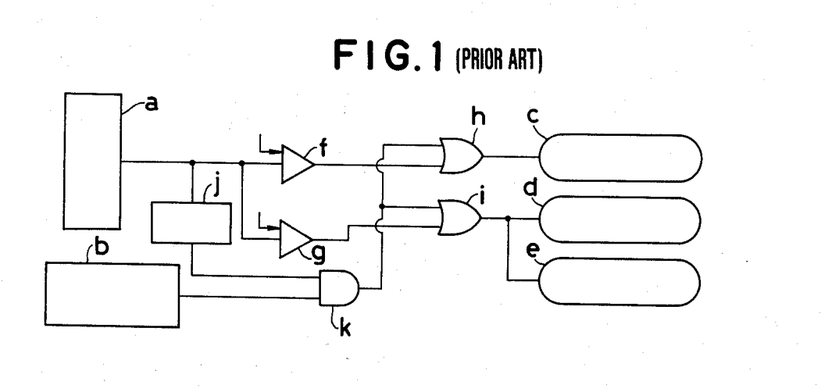
FIG. 1 is a block diagram of a conventional apparatus for controlling operation of vehicle lamps responsive to environmental lighting conditions.

An apparatus is known which automatically turns on or off head lamps, tail lamps or side marker lamps of a travelling vehicle in accordance with the external environment. FIG. 1 shows a conventional apparatus of this type, which has an external light sensor a for detecting external light and transmitting an output signal representing the detected external light, and a distance sensor b. The output signal from the external light sensor a is used for level comparison by a first comparator f having the level of this output signal as a reference value and by a second comparator g. When the head lamps must be turned on, a switch or relay c of the head lamps is driven through a gate circuit h. In this case, an output signal from the second comparator g is used to drive switches or relays d and e of the side marker lamps and the rail lamps through a gate circuit i. When the external light is weak and the head lamps need not be turned on, an output signal is obtained only from the second comparator g to drive the switches d and e and to turn on the side marker lamps and the tail lamps. In consideration of the case wherein the travelling vehicle enters a turnnel or the like during the daytime, when a change exceeding a predetermined value occurs in the output signal from the external light sensor a within a predetermined travel distance, the head lamps, the side marker lamps and the tail lamps are turned on. Reference symbol j denotes a detector for the output signal from the external light sensor a; and k, a gate circuit for receiving an output signal from the detector j and the distance sensor b. An output signal from the gate circuit k is supplied to the gate circuits h and i. Thus, when the vehicle enters a tunnel or the like, the lamps can be turned on.

In this manner, although the conventional apparatus automatically controls the lamps, it does not completely satisfy the actual needs. For example, the operation range of the external light sensor a is wide and the predetermined travel distance is set as a condition so that, during the nighttime, when the vehicle travels in a bright area with a high external illumination level such as in a tunnel, the external light sensor a may not be operated to turn off the head lamps or may erroneously not operate at all. For this reason, when the vehicle enters a tunnel during the daytime, current supply to the head lamps is delayed and the head lamps are held off for a certain period of time.

PRESENT INVENTION

The present invention has been made in consideration of the above and has as its object to provide an automatic light control apparatus which can perform a control operation suitable to the actual travel environment.

SUMMARY OF THE INVENTION

According to the present invention, an automatic light control apparatus for a vehicle, for selectively turning ON and turning OFF at least one of tail lamps, side marker lamps and head lamps in accordance with external light, comprises means for detecting the light level external of the vehicle and for generating signals responsive to the external light level for controlling said lamps. The system is characterized by means for detecting an ON period of an illuminating light having a fluctuating light value; and means responsive to said detecting of said ON period, and to said signals generated by said external light detecting means, for controlling said lamps as a function of said external light detection and said ON period illuminating light detection.

According to another aspect of the invention, the system is characterized in that there is further provided means for detecting an abrupt change in illuminance appearing during a unit travel distance or a unit travel time, and the lamps are further controlled responsive to said detected abrupt change in illuminance.

DETAILED DESCRIPTION

Figure 2:
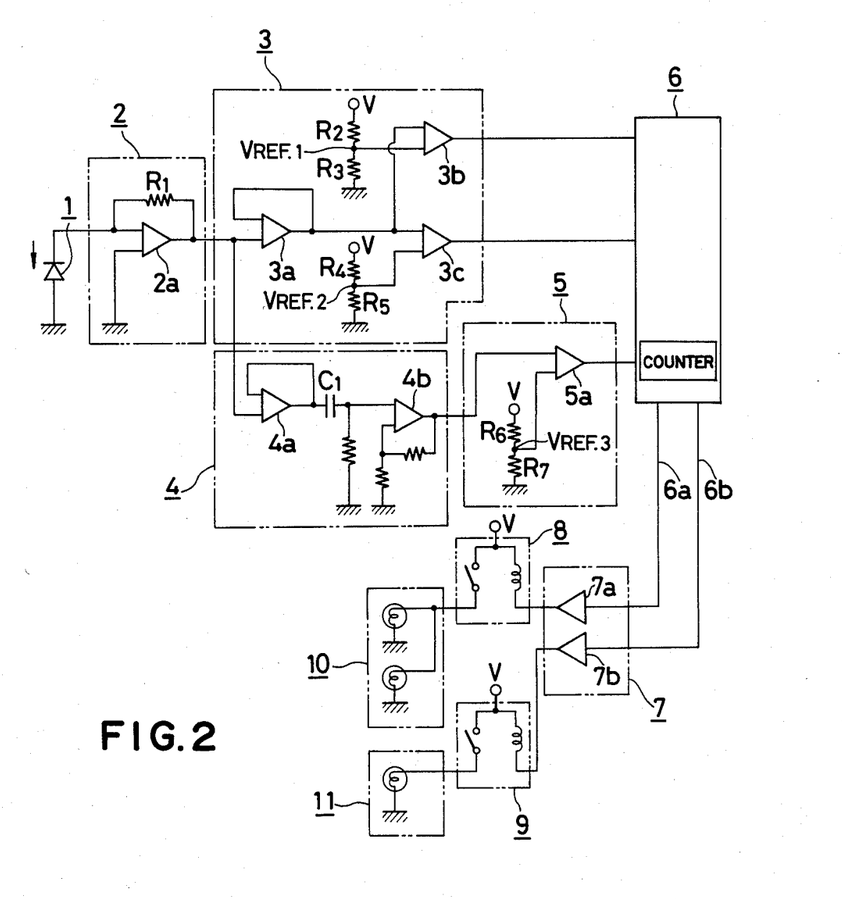
FIG. 2 is a block diagram of a vehicle lamp control apparatus according to the present invention.

Referring to FIG. 2 an external light sensor 1, such as a photodiode which increases or decreases a current flowing therethrough in accordance with external light, is connected to a current-voltage converter 2 for detecting a change in current flowing in the light sensor 1 as a change in voltage. The converter 2 comprises a voltage comparator 2a and a resistor R1. The converter 2 is connected to a level comparator 3 which comprises a buffer circuit 3a and two voltage comparators 3b and 3c. The buffer circuit 3a has a function to supply a voltage signal from the current-voltage converter 2 to the voltage comparators 3b and 3c. The voltage 3b compares the received voltage signal with a first reference voltage ($V_{REF.1}$) set by resistors R2 and R3. When the voltage signal becomes smaller than the reference signal $V_{REF.}1$, the voltage comparator 3b generates a first drive signal. The voltage comparator 3c compares the voltage signal with a second reference voltage ($V_{REF.}2$) set by resistors R4 and R5. When the voltage signal becomes smaller than the reference signal $V_{REF.}2$, the voltage comparator 3c generates a second drive signal. The reference voltage $V_{REF.}1$ of the voltage comparator 3b is set to be higher than that ($V_{REF.}2$) of the voltage comparator 3c. As will be apparent from the following description, the first drive signal is for turning on the tail lamps and the side marker lamps, and the second drive signal is for turning on the head lamps. When the second drive signal is generated, the first drive signal is also generated.

An AC amplifier comprises a buffer circuit 4a for receiving a voltage signal from the current-voltage converter 2, a capacitor C1 for cutting off the DC component of an output signal from the buffer circuit 4a, and an amplifier 4b. The AC amplifier 4 is arranged so as to respond when the external light sensor 1 detects external light from a fluorescent lamp or a sodium lamp which involves a change in an AC voltage.

An AC detector comprises a voltage comparator 5a which compares an AC voltage signal from the AC amplifier 4 with a reference voltage $V_{REF.3}$ set by resistors R6 and R7. When the AC voltage signal exceeds (becomes smaller than) the reference voltage $V_{REF.3}$, the AC detector 5 generates a third drive signal for turning on the tail lamps, the side marker lamps and the head lamps.

A microcomputer 6 receives the first and second drive signals from the level comparator 3 and the third drive signal from the AC detector 5. When the first drive signal is received, an output signal appears at an output terminal 6a of the microcomputer 6. When the second drive signal is received, an output signal appears at both the output terminal 6a and an output terminal 6b. When the third drive signal is received, an output signal appears at both the output terminals 6a and 6b. When the third drive signal is received, the microcomputer 6 operates in the following manner. The third drive signal serves to discriminate between an instantaneous pulse when the vehicle enters a shadow of an object and the external light sensor 1 detects this, and a continuous pulse based on the constant ON period of a fluorescent lamp or a discharge lamp or powered by a commercial AC source detected near or inside a tunnel. When the vehicle enters a shadow of an object, the microcomputer 6 does not produce an output signal at the output terminals 6a and 6b. In the case of an AC powered discharge lamp, the microcomputer 6 produces an output signal at the output terminals 6a and 6b. In this manner, an erroneous operation due to a noise signal is prevented.

A relay driver 7 comprises an amplifier 7a for amplifying an output signal from the output terminal 6a and another amplifier 7b for amplifying an output signal from the output terminal 6b. A relay circuit 8 is connected to the amplifier 7a and is energized by the output signal from amplifier 7a to close a current path to the loads 10 comprising the tail lamps and side marker lamps. Another relay circuit 9 is connected to the amplifier 7b to be energized by its output signal to close a current path to the loads 11 comprising the head lamps.

Figure 3A:
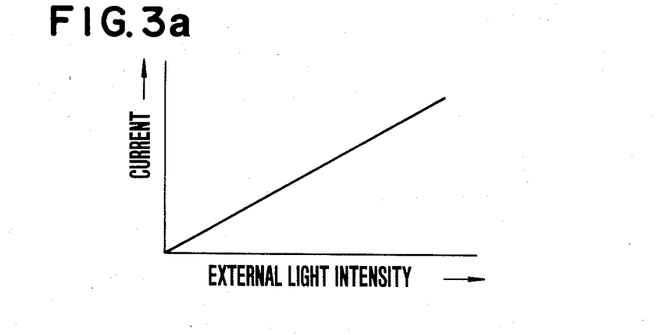
FIG. 3a is a graph showing changes in current with changes in external light intensity.

With the above described circuit, the loads 10 and 11 can be controlled in the following manner in accordance with the travelling environment. The details of operation of the circuit of FIG. 2 will be described with reference to FIGS. 3a, 3b and 4a-4c. External light changes as shown in FIG. 3a. The current from the external light sensor 1 for detecting the external light is converted into a voltage signal by the currentvoltage converter 2, and appears as a product of the resistance of the resistor R1 and the current as indicated along the axis of ordinate in FIG. 3a. Similar characteristics are also obtained when illumination light is considered in addition to the external light (see FIG. 3b). Therefore, when the voltage signal from the current-voltage converter 2 becomes smaller than the value set by the level comparator 3, for example, the reference voltage $V_{REF.2}$ of the voltage comparator 3c, the output levels of the voltage comparators 3b and 3c are inverted.

Then, the first and second drive signals are generated, the microcomputer 6 is operated to produce output signals at the output terminals 6a and 6b, and the relay driver 7 is energized to excite (i.e. turn on) the relay circuits 8 and 9. The contacts of the relay circuits 8 and 9 are closed to supply a current to the loads 10 and 11. When the external light sensor 1 detects external light and the voltage signal from the voltagecurrent converter 2 exceeds the reference voltages of the voltage comparators 3b and 3c, the output levels from these comparators are inverted. Generation of the first and second drive signals is stopped, and current supply to the loads 10 and 11 is stopped. However, when the voltage signal has a value intermediate the values of the reference voltages of the voltage comparators 3b and 3c, a current is supplied only to the loads 10 and current supply to the loads 11 is stopped. This corresponds to the environment before sunset where the head lamps need not be turned on but the tail lamps and the side marker lamps must be turned on.

Prevention of an erroneous operation when the vehicle passes under a shadow during travel during the daytime or enters a tunnel will be described below.

Figure 4A:
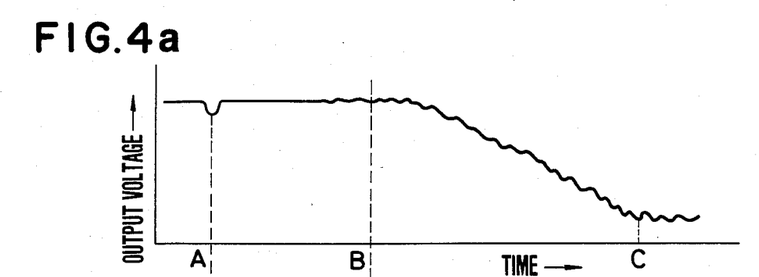
FIG. 4a, 4b and 4c are timing charts of output signals at main parts of the apparatus shown in FIG. 2.

When the vehicle passes under a shadow or enters a tunnel, the external light sensor 1 detects a change in ambient external light, and an output voltage as shown in FIG. 4a appears from the current-voltage converter 2 in accordance with the travelling environment. The travelling environment is plotted along the axis of the abscissa in FIG. 4a. Point A corresponds to a point in time at which the vehicle passes under a shadow. Point B corresponds to the entrance of a tunnel. Point C corresponds to a position inside the tunnel at which no external (i.e. natural) light is present and only artificial illumination light in the tunnel is present. At a point immediately before the point B, both the external light and the illumination in the tunnel are detected. In a range between the points B and C, both the external light and the illumination are detected. The AC amplifier 4 cuts off the DC component of the output voltage shown in FIG. 4a, and the amplifier 4b amplifies the AC component. Note that the AC component used herein corresponds to one which appears due to the ON period (100 Hz or 120 Hz) of tunnel illumination of a fluorescent lamp or a sodium lamp powered by an AC power source at the point B or in a range between the entrance and exit of the tunnel.

Figure 4B:
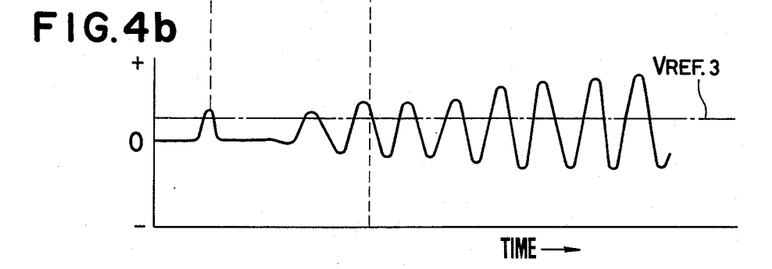
Figure 4C:
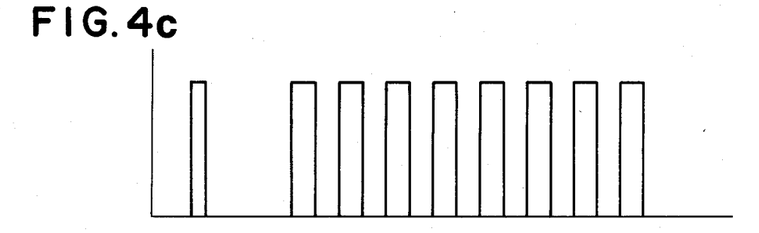

An AC voltage signal from the AC amplifier 4 is supplied to the AC detector 5 and is compared with a reference voltage $V_{REF.3}$ (FIG. 4B). When the AC voltage exceeds (or becomes smaller than) the reference voltage $V_{REF.3}$, the AC detector 5 generates a pulse wave shown in FIG. 4c. In response to this pulse wave, the microcomputer 6 produces output signals at the output terminals 6a and 6b. The condition for this is a predetermined count of the pulse waves. For example, in response to the pulse wave, a timer in microcomputer 6 is started at its leading edge. The number of further pulses received per unit time is counted, or the rise time of the next pulse is counted a plurality of times. This is effective in preventing an erroneous operation wherein when the vehicle passes under a shadow to prevent turning on of light responsive to a short duration dark period. Thus, at point A in FIGS. 4a-4c, the vehicle lights are not turned on since an insufficient number of pulses in FIG. 4c is generated. In addition, in a place with a light source having a constant ON period such as in a tunnel, since the ON period is detected at the entrance of the tunnel, the loads can be driven without delay. Furthermore, even if the interior illumination of the tunnel is bright, the power supply to the loads will not be cut off. Under this condition, the microcomputer 6 produces output signals at the output terminals 6a and 6b and drives the loads 10 and 11 even if the first and second drive signals are not received.

The above description has been made with reference to the case wherein the microcomputer 6 counts pulse waves or counts rise times. However, a band-pass filter or a highpass filter can be inserted in front of the AC detector 5 to select only specific AC waves. With this arrangement, discrimination between illumination involving a constant ON period such as in a tunnel or another noise can be easily performed.

As described above, the apparatus of the present invention has a means for detecting a continuous constant ON period of illumination inside a tunnel at its entrance as well as external light (i.e. natural light), and for automatically controlling ON/OFF states of vehicle lamps in accordance with signal processing results of detection signals. Therefore, in addition to the fact that the apparatus operates in accordance with external light, it does not cause an erroneous operation of turning on lamps when the vehicle passes under a shadow. Moreover, when the vehicle approaches a tunnel, it detects the ON period of the internal (artificial AC generated) illumination at the entrance of the tunnel. Therefore, the operation of the apparatus will not be delayed, and the proper control operation corresponding to changes in environment during travel of the vehicle can be obtained. In a tunnel, even if the internal illumination is bright, the continuous ON period of the internal AC generated illumination is detected. Therefore, the illumination lamps of the vehicle will not be turned off due to the bright artificial AC generated illumination inside the tunnel.

The counter in the microcomputer 6 counts a predetermined number of said pulse signals of FIG. 4c over a predetermined period of time. If the required pretermined number of pulse signals of FIG. 4c are received during said predetermined period of time, the microcomputer 6 produces output signals at the output terminals 6a and 6b to illuminate the lamps 10 and 11 even if the first and second drive signals produced from the light sensor 1 and the level comparator 3 are not received.

Figure 6:
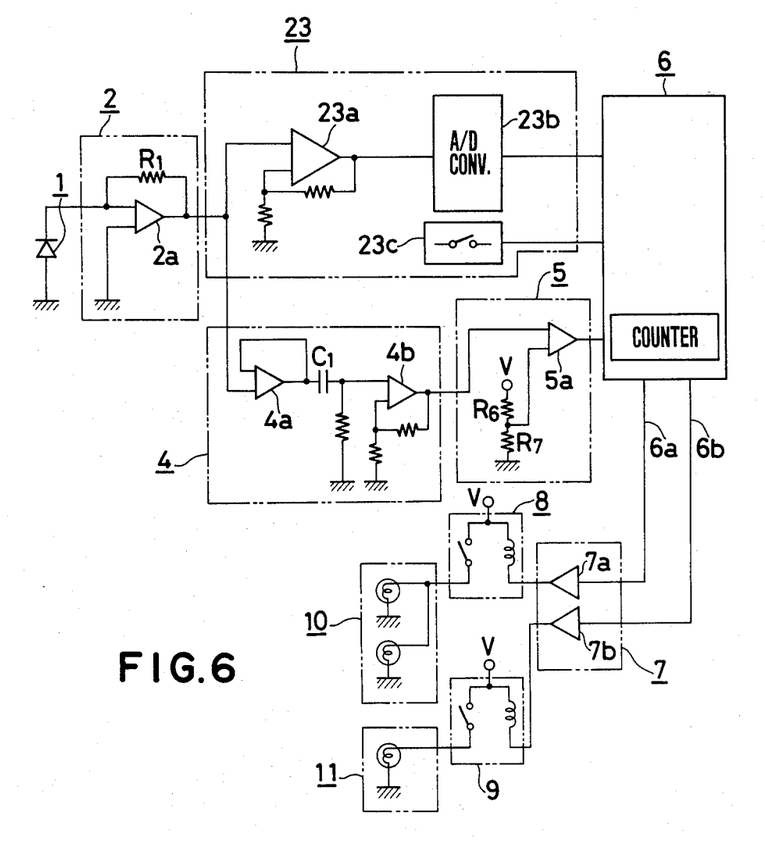
FIG. 6 is a block diagram of an apparatus according to the present invention.

Referring to FIG. 6, the same elements in FIG. 2 are referred to by the numerals in FIG. 6. An external light sensor 1, such as a photodiode which provides an increasing or decreasing current in accordance with external light, is connected to a current-voltage converter 2 for detecting a change in current flowing in the light sensor 1 as a change in voltage. The converter 2 comprises a voltage comparator 2a and a resistor R1. An illuminance detector 23, comprising a buffer circuit 23a, an analog-to-digital converter (to be referred to as an A/D converter) 23b, and a travel distance detector 23c, is coupled to the output of converter 2. The buffer circuit 23a supplies a voltage signal from the current-voltage converter 2 to the A/D converter 23b. The A/D converter 23b generates a digital signal corresponding to the magntiude of the voltage signal. The distance detector 23c is a circuit for detecting the travel distance of the vehicle and produces a signal corresponding to the travel distance or time. In other words, the illuminance detector 23 converts a change in external light illuminance per unit travel distance or time of the vehicle running into a voltage signal. This signal from the illuminance detector 23 is used as an operation signal source for the microcomputer 6, as will be described later. A distinction may be made between a case wherein the light level of the travelling environment of the vehicle is gradually decreased and vehicle illumination must be provided, and a case wherein the light level is abruptly decreased.

The AC amplifier 4 responds to external light from a fluorescent lamp or a sodium lamp which involves a change in an Ac voltage, as in the circuit of FIG. 2. The AC detector operates such that when the AC voltage signal, detected from the light from a fluorescent or AC driven sodium lamp, exceeds (becomes smaller than) a reference voltage, the AC detector 5 generates a drive signal. This is the same as operation of AC detector 5 of FIG. 2.

A microcomputer 6 receives the drive signal from the illuminance detector 23 and the drive signal from the AC detector 5. The microcomputer 6 performs the following operation in order to produce at output terminals 6a and 6b drive signals corresponding to the travelling environment. When the light level of the travelling environment of the vehicle is gradually decreased, in response to the drive signal from the A/D converter 23b, the microcomputer 6 produces a drive signal at the output terminal 6a. When the light level is decreased further, the microcomputer 6 produces drive signals at both the output terminals 6a and 6b. When there is an abrupt change in brightness over a small travel distance or time such as in a case of entering a tunnel from a bright environment, in response to a drive signal from the AC detector, the microcomputer 6 produces drive signals to both the output terminals 6a and 6b.

The microcomputer 6 operates in the following manner in response to the drive signal from the AC detector 5. This drive signal serves to distinguish between an instantaneous pulse wherein the vehicle passes under a shadow during daytime or the pulses produced by the external light sensor 1 which detects passage near an AC driven illumination light which is ON, and continuous pulses of a constant ON period of a fluorescent lamp or a discharge lamp powered by a commercial AC power source which are detected in the vicinity or inside the tunnel.

The relay drive 7 is the same as shown in FIG. 2, as are the relay circuits 8 and 9 which, when energized, operate to selectively close a current path to the loads 10 comprising the tail lamps or side marker lamps and-/or to the loads 11 comprising the head lamps.

Figure 3B:
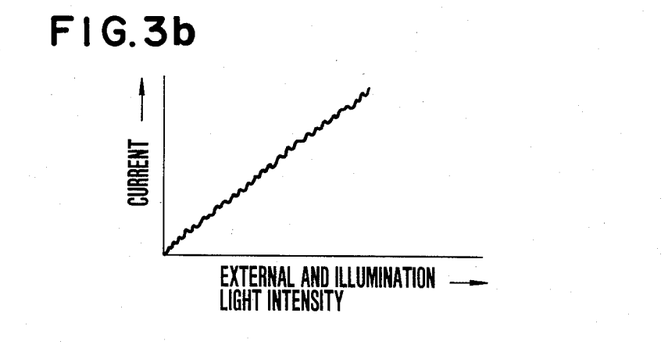
FIG. 3b is a graph showing changes in current with changes in external light and illumination intensities.

With the embodiment of FIG. 6, the loads 10 and 11 can be controlled in the following manner in accordance with the travelling environment. The following details of operation will be described with reference to FIGS. 3a, 3b, 7a, 7b and 7c. The external light changes as shown in FIG. 3a. The current from the external light sensor 1 for detecting the natural external light is converted into a voltage signal by the current-voltage converter 2, and appears as a product of the resistance of the resistor R1 and the current as indicated along the axis of the ordinate. Similar characteristics are also obtained when artificial AC generated illumination light is considered in addition to the natural external light (FIG. 3b). Therefore, as indicated by an alternate long and short chain line P in FIG. 7a, when the external light is gradually decreased and the voltage signal from the current-voltage converter 2 becomes smaller than a reference value e3 indicated in FIG. 7a, the digital signal from the A/D converter 23b is decreased. As a result, the microcomputer 6 produces output signals at the output terminals 6a and 6b. The relay driver 7 is operated by output signals on terminals 6a and 6b to excite the relay circuits 8 and 9, and the contacts of the relay circuits 8 and 9 are closed to supply a current to the loads 10 and 11. On the other hand, when the external light sensor 1 detects external light and the voltage signal from the voltage-current converter 2 exceeds the reference value e3, the digital signal from the A/D converter 23b is also increased and current supply to the loads 10 and 11 is stopped.

In the above description, current supply and stop of current supply to the loads 10 and 11 are performed at the same time. However, in practice, in the case of the current supply, the loads 10 are powered first, responsive to slight darkness. When the external light becomes darker, the loads 11 (head lamps) are then powered. Conversely, when the current supply is stopped, the loads 11 are deenergized first. When the external light becomes lighter, the loads 10 are then deenergized. This can be achieved by setting the reference value e3 in two steps.

Prevention of an erroneous operation when the vehicle passes under a shadow during travel in daytime or travels near illumination light will now be described.

Figure 5:
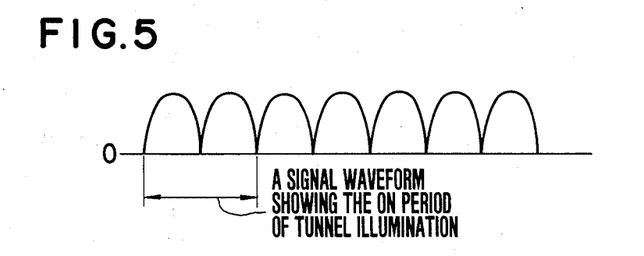
FIG. 5 shows a signal waveform drawn to an enlarged scale showing the ON period of AC generated tunnel illumination.
Figure 7A:
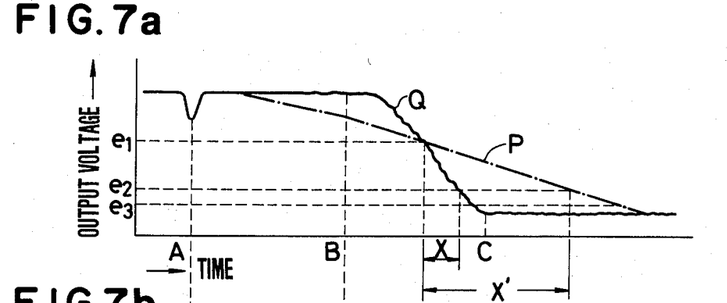
FIGS. 7(a), 7(b) and 7(c) are timing charts of output signals at main parts of the apparatus shown in FIG. 6.
Figure 7B:
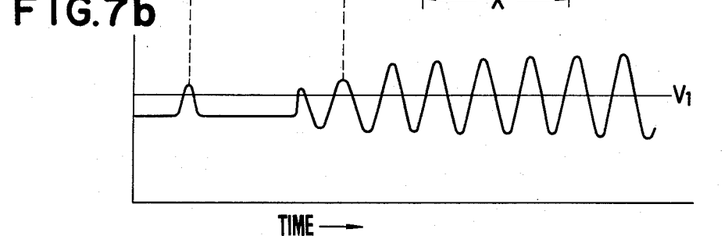
Figure 7C:
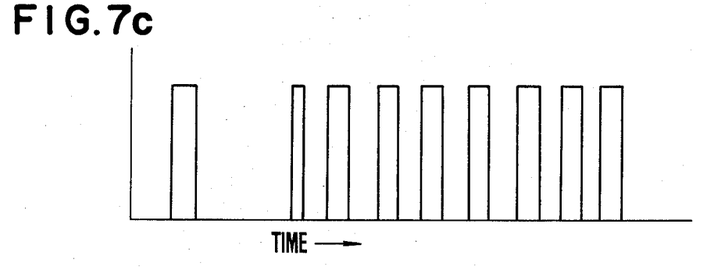

When the vehicle passes under a shadow or enters a tunnel, the external light sensor 1 detects a change in ambient external light, and an output voltage having a characteristic Q as shown in FIG. 7a appears from the current-voltage converter 2 in accordance with the travelling environment. The travelling environment is plotted along the axis of abscissa. Point A corresponds to a point at which the vehicle passes under a shadow or under illumination light. Point B corresponds to the entrance of a tunnel. Point C corresponds to a position inside the tunnel at which no external light is present and only illumination in the tunnel is present. At a point immediately before the point B, both the external light and the illumination in the tunnel are detected. In a range between the points B and C, both the external light and the illumination are detected. Meanwhile, the AC amplifier 4 cuts off the DC component of the output voltage shown in FIG. 7a, and the amplifier 4b amplifies the AC component. Note that the AC component used herein corresponds to one which appears due to the ON period (100 Hz or 120 Hz) of tunnel illumination of a fluorescent lamp or a sodium lamp powered by an AC power source at the point A or in a range between the entrance and exit of the tunnel (FIG. 5).

When the vehicle approaches the entrance of a tunnel during daytime, at the point B, the sensor 1 detects the external light and the illumination light. As the vehicle approaches the entrance, the illuminance is abruptly decreased. The microcomputer 6 starts operations when the voltage signal from the A/D converter 23b reaches a preset value e1 and counts the travel distance or time until the voltage signal reaches a value e2 in accordance with the signal from the distance detector 23c.

The travel distance or time before the signal reaches the value e2 is set as a preset value X. When this value is X' which is larger than X, the microcomputer 6 does not produce an output. When the output signal is equal to or smaller than the preset value X and an input pulse of 100 or 120 Hz is supplied from the voltage comparator 5a, the micrcomputer 6 produces output signals from the output terminals 6a and 6b to drive the loads 10 and 11. At the point C, the detected light is illumination light. Since the illumination light is below the reference value e3, the loads are kept ON. Therefore, when the travelling vehicle passes below a shadow or receives illumination light for some reason during daytime, the output voltage drops at the point A and the pulse signal is produced from the voltage comparator 5a. However, since the condition for the reference value X is not satisfied, drive signals will not be produced from the output terminals 6a and 6b.

As has been described above, the apparatus of FIG. 6 has a means for separately detecting an abrupt change and a slow change in external light, for detecting a continuous ON period of illumination in the vicinity of a tunnel and performing signal processing, and for automatically controlling the ON/OFF states of vehicle illumination. Therefore, the apparatus can operate in accordance with the external light. When the vehicle passes below a shadow or when the vehicle passes under illuminating light during daytime travel, this will not result in an erroneous operation of turning on the lamps. In addition, when the vehicle approaches a tunnel, the apparatus can detect abrupt changes at the entrance and the ON period of the internal illumination, and the operation will not be delayed, thereby providing a control operation in accordance with changes in environment.

The distance detector 23c may be connected to the speedometer system of the vehicle so as to measure the travelling distance of the vehicle. Alternatively, the distance detector 23 may produce a signal corresponding to a travelling time (it may be a timer) corresponding to the value "X" in FIG. 7a.

Throughout the foregoing specification, the expression "external light" refers to ambient or natural light occurring in the atmosphere. The expression "illumination light" refers to artificially generated light, generally by an A.C. power source, which has fluctuations corresponding to alternate ON and OFF times.

We claim:

1. In an automatic light control apparatus for a vehicle, for selectively turning ON and turning OFF at least one of tail lamps, side marker lamps and head lamps of the vehicle in accordance with the amount of external light, comprising first detecting means for detecting the light level externally of the vehicle; and first generating means for generating at least one first control signal responsive to the detected external light level for controlling operation of said vehicle lamps, the improvement comprising:
second detecting means for detecting an ON period of an illuminating light, external of said vehicle, and having a fluctuating light value;
second generating means responsive to said detecting of said ON period of said fluctuating light for generating at least one second control signal; and
control means responsive to said first and second control signals for controlling said lamps as a function of both said detected external light and said detected ON period of said fluctuating illuminating light.

2. The automatic light control apparatus of claim 1, wherein said illuminating light has alternating ON and OFF periods, and wherein said second generating means is responsive to a predetermined number of detected ON periods of said illuminating light within a given time period for generating said second control signal to maintain at least one of said vehicle lamps ON.

3. The automatic light control apparatus of claim 1, wherein said first generating means selectively generates first and second operation signals responsive to a lowering of the detected external light level to predetermined levels, said first operation signal turning ON said tail and side marker lamps of said vehicle, and said second operation signal turning ON said head lamps of said vehicle.

4. The automatic light control apparatus of claim 3, wherein said first generating means comprises threshold means for generating both of said first and second operation signals when the external light level is below a first predetermined level, for generating only said first operation signal when said external light is between first and second predetermined levels, and for generating neither of said first and second operation signals when said light level exceeds said second predetermined level.

5. The automatic light control apparatus of claim 1, wherein said control means includes means responsive to said first control signal for turning ON at least one of said lamps of said vehicle responsive to detection of a low external light level, and means responsive to said second control signals for maintaining said at least one lamp ON in the presence of illumination generated by a fluctuating light source, even if the ambient light level generated by said fluctuating light source is sufficiently high to turn OFF said first control signals.

6. The automatic light control apparatus of claim 5, wherein said illuminating light has alternating ON and OFF periods, and wherein said second generating means is responsive to a predetermined number of detected ON periods of said illuminating light within a given time period for generating said second control signal to maintain at least one of said vehicle lamps ON.

7. The automatic light control apparatus of claim 1, further comprising means coupled to said first generating means for detecting the rate of change of the external light level detected by said first detecting means, and for generating a further control signal responsive to the detected rate of change for causing turning ON of at least one of said vehicle lamps when said external light level abruptly changes to a given dark level at a rate corresponding to a predetermined rate.

8. The automatic light control apparatus of claim 7, wherein said further control signal is generated responsive to the detected rate of change exceeding said predetermined rate.

9. The automatic light control apparatus of claim 7, wherein said means for detecting said rate of change includes means for detecting the rate of change of the external light level as a function of distance traveled by the vehicle.

10. The automatic light control apparatus of claim 7, wherein said means for detecting said rate of change includes means for detecting the rate of change of the external light level as a function of the travel time of the vehicle.

11. The automatic light control apparatus of claim 7, wherein said illuminating light has alternating ON and OFF periods, and wherein said second generating means is responsive to a predetermined number of detected ON periods of said illuminating light within a given time period for generating said second control signal to maintain at least one of said vehicle lamps ON.

* * * * *